United States Patent [19]

Hofirek

[11] 4,377,556

[45] Mar. 22, 1983

[54] PROCESS FOR REMOVING DISSOLVED SELENIUM VALUES FROM AN ACIDIC AQUEOUS COPPER SULPHATE SOLUTION

[75] Inventor: Zoenek Hofirek, Rustenburg, South Africa

[73] Assignee: Sherritt Gordon Mines Limited, Toronto, Canada

[21] Appl. No.: 366,806

[22] Filed: Apr. 9, 1982

[51] Int. Cl.³ .................. C01G 3/10; C01B 19/04
[52] U.S. Cl. ............................. 423/42; 423/43; 423/509; 423/557; 204/108
[58] Field of Search .................. 423/509, 510, 34, 42, 423/43, 557; 75/117; 204/108

[56] References Cited

U.S. PATENT DOCUMENTS

| | | | |
|---|---|---|---|
| 3,914,375 | 10/1975 | Clark et al. | 423/43 |
| 3,959,097 | 5/1976 | Queneau et al. | 423/509 |
| 4,026,797 | 5/1977 | Nikolic et al. | 423/510 |
| 4,222,999 | 9/1980 | Weir et al. | 432/42 |
| 4,330,508 | 5/1982 | Weir et al. | 432/43 |

OTHER PUBLICATIONS

Zingaro; Ralph A., *Selenium*, 1974, pp. 46-56.

Primary Examiner—O. R. Vertiz
Assistant Examiner—Robert L. Stoll
Attorney, Agent, or Firm—Robert F. Delbridge; Arne I. Fors

[57] ABSTRACT

Dissolved selenium values are removed from an acidic aqueous copper sulphate solution by treating the solution at a temperature of at least about 140° C. with a stoichiometric excess relative to the dissolved selenium of sulphur dioxide or a sulphite solution to produce a selenium-containing precipitate and dissolved cuprous copper. The temperature of the treated solution is maintained at at least about 140° C. and an oxygen containing gas is passed into the treated solution under a pressure of at least about 350 kPa to oxidize dissolved cuprous copper to dissolved cupric copper.

9 Claims, 1 Drawing Figure

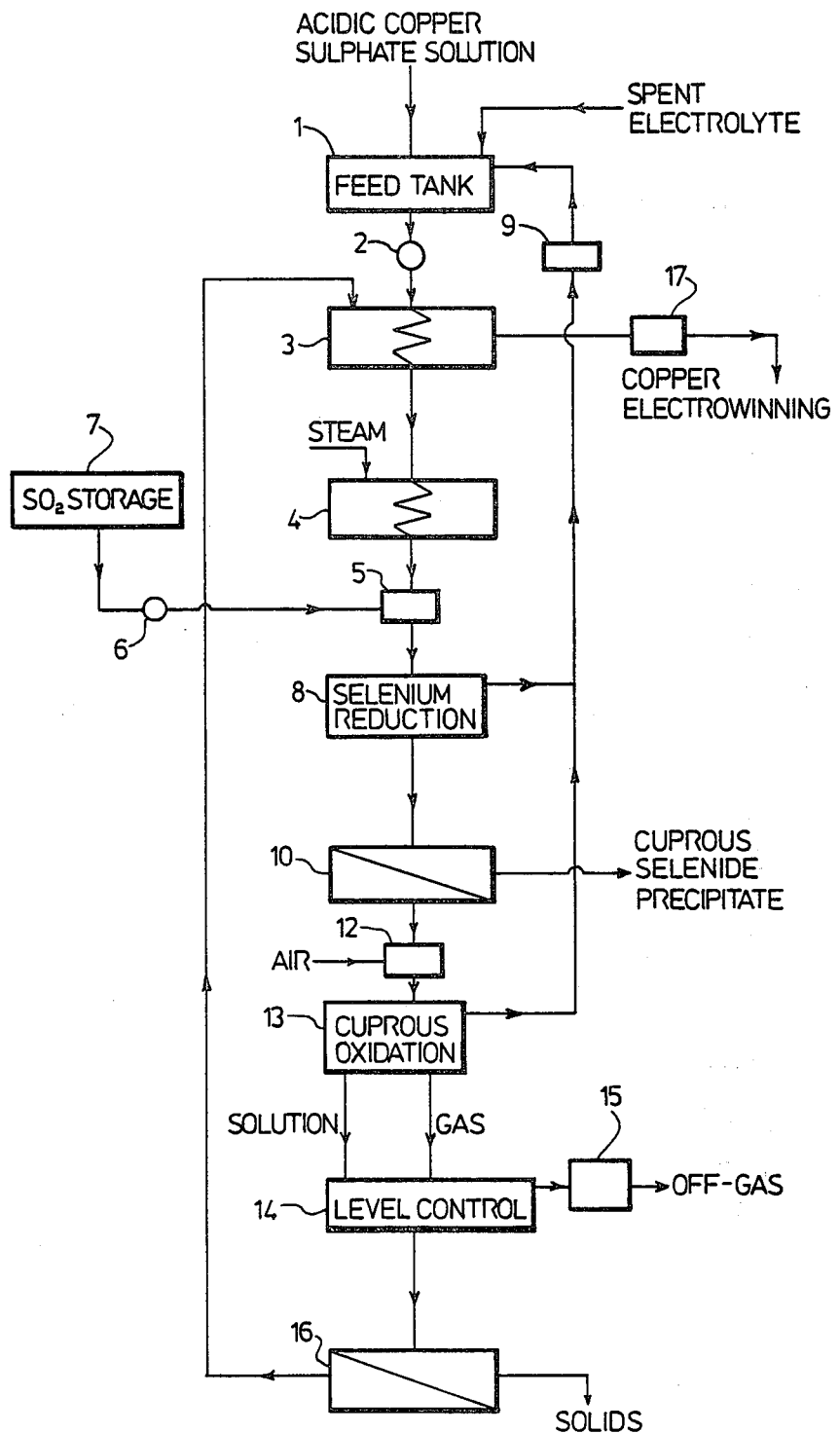

PROCESS FOR REMOVING DISSOLVED SELENIUM VALUES FROM AN ACIDIC AQUEOUS COPPER SULPHATE SOLUTION

This invention relates to a process for removing dissolved selenium values from an acidic aqueous copper sulphate solution.

Many processes for the recovery of copper from its ores include an electrowinning step in which an acidic aqueous copper sulphate solution is electrolyzed to deposit elemental copper on the cathode of an electrolytic cell. Copper ores also frequently contain selenium and, as a result of the treatment of such ores, culminating in the production of the acidic aqueous copper sulphate solution to be electrolyzed, dissolved selenium values will probably be present in the copper sulphate solution. The dissolved selenium values are usually present both as tetravalent selenium (IV) and as hexavalent selenium (VI).

Since selenium tends to co-deposit with copper in the electrolytic cell, thereby contaminating the copper product, it is frequently necessary to reduce the concentration of dissolved selenium to an adequate low value. Various selenium removal processes have been proposed in which the copper sulphate solution is treated with sulphur dioxide or a sulphite solution to produce a selenium-containing precipitate which is subsequently separated from the solution. To achieve adequate selenium (VI) removal, it is necessary to carry out the treatment with sulphur dioxide or sulphite solution at a temperature of at least about 140° C. Although selenium (IV) and (VI) can be adequately removed at such temperatures, subsequently cooling of the solution to below 140° C. is likely to result in the precipitation of metallic copper and consequent deposition of the precipitated copper on the walls of the equipment concerned. Such deposition is extremely disadvantageous, especially in continuous flow processes where the copper may be deposited in heat exchangers, valves or narrow passages to cause blockages.

It is therefore an object of the invention to provide a selenium removal process of the kind referred to about but in which the likelihood of copper being deposited when the solution is cooled to a temperature below 140° C. is substantially reduced.

According to the invention, an aqueous acidic copper sulphate solution containing dissolved selenium values and with substantially all the dissolved copper in cupric form is treated at a temperature of at least about 140° C. with a stoichiometric excess relative to the dissolved selenium of sulphur dioxide or a sulphite solution to produce a selenium-containing precipitate and some dissolved cuprous copper and, while maintaining the solution at a temperature of at least about 140° C., an oxygen containing gas is passed into the solution under a pressure of at least about 350 kPa to oxidize substantially all the dissolved cuprous copper to dissolved cupric copper.

The invention is based upon the realization that the stoichiometric excess of sulphur dioxide or sulphite solution required for an adequately fast reaction time in the selenium-precipitation step also causes the reduction of at least some of the copper in the copper sulphate solution from the cupric form to the cuprous form. The dissolved cuprous copper is unstable and readily disproportionates to cupric copper and elemental copper when the temperature of the solution falls below about 140° C.

Preferably, the solution is treated with a stoichiometric excess of from about 5 to about 200 moles of selenium reducing compound per mole of dissolved selenium to produce the selenium-containing precipitate.

The selenium-containing precipitate may be separated from the solution prior to the oxidation step.

The initial acidic aqueous copper sulphate solution may typically contain from about 10 to about 100 g/L dissolved copper, from about 5 to about 500 mg/L dissolved selenium, and from about 10 to about 100 g/L sulphuric acid. The solution may also contain from about 1 to about 120 g/L dissolved nickel.

The oxidation step is preferably carried out at a temperature in the range of from about 140 to about 175° C., and at a pressure in the range of from about 800 to about 1500 kPa. The selenium-precipitation step may advantageously be carried out at a similar pressure to the oxidation step, that is to say at a pressure of at least about 350 kPa, and preferably at a pressure in the range of from about 800 to about 1500 kPa.

One embodiment of the invention will now be described, by way of example, with reference to the accompanying drawing which shows a flow diagram of a selenium removal process.

Referring to the drawing, aqueous acidic copper sulphate solution is supplied to an agitated feed tank 1 from a leaching process in which nickel-copper matte is leached in sulphuric acid solution in at least two stages, including a preliminary stage in which a substantial proportion of the nickel in the matte is dissolved and removed in a separate leach solution. The copper sulphate leach solution supplied to feed tank 1 contains about 60 g/L copper, 50 g/L nickel, 10 g/L sulphuric acid, 5 mg/L selenium (IV) and 30 mg/L selenium (VI). Spent electrolyte from a subsequent copper electrowinning step is fed into the feed tank 1 at a rate sufficient to maintain the acidity of the solution in the feed tank 1 at about 20 g/L sulphuric acid. The copper sulphate solution is pumped at a temperature of about 50° C. from the feed tank 1 by a pump 2 at a pressure of about 1200 kPa through two spiral heat exchangers 3, 4. In the heat exchanger 3, the copper sulphate solution is pre-heated by solution at a temperature of about 160° C. passing from the selenium removal process to a copper electrowinning step. In the heat exchanger 4, the pre-heated copper sulphate solution is heated by steam to a temperature of 175° C., the heat exchanger 4 being automatically controlled such that the desired solution temperature is maintained.

The heated copper sulphate solution then passes to a static mixer 5 where the solution is mixed with liquid sulphur dioxide pumped by a diaphragm metering pump 6 from a sulphur dioxide storage system 7 at a rate of 2 to 3 g of sulphur dioxide per liter of feed solution, thereby providing a stoichiometric excess of about 70 to about 100 moles of sulphur dioxide per mole of dissolved selenium. The mixed solution then passes to a reduction step 8 comprising four vertical reduction autoclaves in series under a pressure of about 1,000 kPa. Each autoclave 8 has a safety bursting disc set at 1400 kPa at the top, with the outlet therefrom being connected through a flash tank 9 to the feed tank 1. Each autoclave 8 also has a manually controlled heating coil to enable the temperature in each autoclave 8 to be maintained at about 175° C.

The mixed solution passes upwardly through each autoclave 8 with no agitation and, during passage therethrough, dissolved selenium is precipitated as cuprous selenide, it having been found that substantially no elemental copper is precipitated by the sulphur dioxide at temperatures above about 150° C. However, the sulphur dioxide does reduce some of the dissolved cupric copper to the cuprous state. The sulphur dioxide treatment in the autoclaves 8 reduce the selenium content of the solution to about 0.1 mg/L dissolved selenium (IV) and about 1 mg/L dissolved selenium (VI).

After leaving the fourth autoclave 8, the copper sulphate solution with precipitated cuprous selenide is passed to a filter assembly 10 where the cuprous selenide precipitate is filtered from the copper sulphate solution. Since the solution is still at a pressure of about 1,000 kPa, the filter assembly 10 actually comprises two filter units in parallel, with only one filter unit being in operation at a time. The operating filter unit is operated until the differential pressure across the filter reaches about 200 kPa, and the solution flow is then switched to the other filter unit. Solution in the first filter unit is transferred to the second filter unit by high pressure air, and the first filter unit is then opened to remove the cuprous selenide precipitate.

The filtered copper sulphate solution proceeds from the filter assembly 10 through a static mixer 12 where high pressure air is injected to provide a stoichiometric excess of oxygen relative to the cuprous ion concentration. The aerated solution is then passed to an oxidation step 13 comprising two vertical autoclaves 13 in series with the solution still being under a pressure of about 1,000 kPa. Each autoclave 13 has a manually controlled heating coil to enable the solution temperature therein to be maintained at about 160°–170° C., and also has a safety bursting disc set at 1400 kPa at the top with an outlet connected to the flash tank 9. In the autoclaves 13, cuprous ions in solution are oxidized to the cupric state. Typically, the solution entering the first autoclave 13 may contain about 1 to 5 g/L cuprous ions, about 99% of which are oxidized to the cupric state by the time the solution leaves the first autoclave 13. The residual cuprous ions are then almost completely oxidized in the second autoclave 13. Spent gas leaves the top of each autoclave 13 and passes through a level control tank 14 where the gas is demisted and is then released to atmosphere through a valve 15 controlled by a pressure sensor in the tank 14 to automatically maintain a pressure of about 1,000 kPa in the system. The oxygen concentration in the off-gas emitted from valve 15 may be measured to enable appropriate adjustment to be made to the supply of high pressure air to the mixer 12. Advantageously, the supply of air is such that there is a stoichiometric excess of oxygen of about 3 times that required for oxidation of the cuprous ions to ensure at least 99% oxidation in each autoclave 13.

The deselenized copper sulphate solution, with dissolved copper now substantially only in cupric form, leaves the second autoclave 13 through an overflow pipe somewhat below the top of the autoclave and enters the level control tank 14, which is equipped with level probes maintaining a desired solution level in the oxidation autoclaves 13. The solution passes from the level control tank 14 through a filter assembly 16 for clarification purposes. The filter assembly 16 comprising two filter units operated in a similar manner to those of the filter assembly 10. After leaving the filter assembly 16, the clarified solution passes through the heat exchanger 3 to pre-heat the selenium-containing copper sulphate solution, as previously mentioned, and then proceeds to a copper electrowinning step through a release valve 17 controlled by level probes in the level control tank 14.

Thus, the copper sulphate solution is deselenized in a continous process under a pressure of about 1,000 kPa from the pump 2 to the release valve 17 and at a temperature of at least 160° C. from the heat exchanger 4 to the level control tank 14, with cuprous ions formed in the selenium precipitation autoclaves 8 being oxidized to the cupric stage in the oxidation autoclaves 13. A solution containing cuprous ions is therefore always at a temperature of at least 160° C., thereby substantially eliminating the possibility of elemental copper being formed by disproportionation of cuprous ions and deposition in valuable parts of the system.

In the described embodiment, the cuprous selenide precipitate was removed prior to the oxidation step, with such a procedure preventing any selenium redissolution in the oxidation step. If desired, the cuprous selenide precipitate may be present during the oxidation step without any substantial selenium redissolution, particularly when the temperature of the oxidation step is maintained below about 160° C. However, it has been found that, if an intermediate filtration step between the reduction and the oxidation autoclaves is provided, copper selenides with a copper to selenium molar ratio close to 1:1 can be obtained, probably due to the leaching of copper from cuprous selenide by the cupric ion. In this case, less copper is removed from the solution as selenide.

The removal of dissolved selenium (IV) values reduces selenium contamination in the copper product produced in copper electrowinning. The removal of dissolved selenium (VI) values is particularly advantageous where the solution also contains dissolved nickel which is subsequently recovered in a nickel electrowinning step, since generally speaking both dissolved selenium (IV) and dissolved selenium (VI) contaminate electrowon nickel.

The cuprous oxidation step of the present invention is of course applicable to selenium precipitation steps other than that described in the preferred embodiment, and is in fact applicable to selenium precipitation steps in which an acidic aqueous copper sulphate solution is treated at a temperature of at least about 140° C. with sulphur dioxide or a sulphite solution. For example, the selenium precipitation step may be similar to that described in Canadian patent application No. 358,594 filed Aug. 19, 1980 or in Canadian application No. 389,144 filed Oct. 30, 1981.

The selenium reducing compound may be a sulphite solution, and this term is intended to include bisulphite and pyrosulphite solutions.

Other embodiments will be readily apparent to a person skilled in the art, the scope of the invention being defined in the appended claims.

What I claim as new and desire to protect by Letters Patent of the United States is:

1. A process for removing dissolved selenium values from an acidic aqueous copper sulphate solution comprising treating the solution at a temperature of at least about 140° C. with a stoichiometric excess relative to the dissolved selenium of selenium-reducing compound selected from the group consisting of sulphur dioxide and a sulphite solution to produce a selenium-containing precipitate and dissolved cuprous copper, maintaining the temperature of the treated solution at at least about 140° C. and passing an oxygen-containing gas into the treated solution under a pressure of at least about 350 kPa to oxidize dissolved cuprous copper to dissolved cupric copper.

2. A process according to claim 1 including separating the selenium-containing precipitate from the solution prior to the oxidation step.

3. A process according to claim 1 wherein the acidic aqueous copper sulphate solution contains from about 10 to about 100 g/L dissolved copper, from about 5 to about 500 mg/L dissolved selenium, and from about 10 to about 100 g/L sulphuric acid.

4. A process according to claim 1 wherein the acidic aqueous copper sulphate solution also contains from about 1 to about 120 g/L dissolved nickel.

5. A process according to claim 1 wherein the treated solution is maintained at a temperature in the range of from about 140° to about 175° C. during the oxidation step.

6. A process according to claim 1 wherein the oxidation step is carried out at a pressure in the range of from about 800 to about 5,000 kPa.

7. A process according to claim 1 wherein the selenium precipitation step is carried out at a pressure of at least about 350 kPa.

8. A process according to claim 7 wherein the selenium precipitation step is carried out at a pressure in the range of from about 800 to about 5,000 kPa.

9. A process according to claim 1 wherein the solution is treated with a stoichiometric excess of from about 5 to about 200 moles of reducing compound per mole of dissolved selenium to produce the selenium-containing precipitate.

* * * * *